United States Patent
Harris et al.

(10) Patent No.: US 9,538,402 B2
(45) Date of Patent: Jan. 3, 2017

(54) FAULT MANAGEMENT TRAFFIC REDUCTION IN HETEROGENEOUS NETWORKS

(71) Applicant: Nokia Solutions and Networks Oy, Espoo (FI)

(72) Inventors: John M. Harris, Glenview, IL (US); Anatoly Andrianov, Schaumburg, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 113 days.

(21) Appl. No.: 13/630,063

(22) Filed: Sep. 28, 2012

(65) Prior Publication Data

US 2013/0083669 A1 Apr. 4, 2013

Related U.S. Application Data

(60) Provisional application No. 61/541,229, filed on Sep. 30, 2011.

(51) Int. Cl.
*H04W 8/00* (2009.01)
*H04W 48/16* (2009.01)
(Continued)

(52) U.S. Cl.
CPC ............. *H04W 24/04* (2013.01); *H04W 24/08* (2013.01)

(58) Field of Classification Search
CPC ............. H04W 28/04; H04W 28/0231; H04W 28/0268; H04W 24/00; H04W 24/02; H04W 24/04; H04W 24/08; H04W 24/10; H04W 12/02; H04W 12/04; H04W 12/06; H04W 12/08; H04W 88/08; H04W 48/16; H04L 47/12; H04L 49/25; H04L 49/101; H04L 49/351
(Continued)

(56) References Cited

U.S. PATENT DOCUMENTS 6,385,665 B1 * 5/2002 Canady et al. ................... 710/2
6,420,968 B1 * 7/2002 Hirsch ................ H04L 41/0206
340/3.43

(Continued)

FOREIGN PATENT DOCUMENTS

EP 2360960 A2 8/2011
JP 2005210360 A 8/2005
(Continued)

OTHER PUBLICATIONS

3GPP TSG SA WG5 (Telecom Management) Meeting #78, S5-112435, Aug. 22-26, 2011; Istanbul, Turkey.
(Continued)

*Primary Examiner* — Edan Orgad
*Assistant Examiner* — Sithu Ko
(74) *Attorney, Agent, or Firm* — Harrington & Smith

(57) ABSTRACT

A method includes configuring one or more network nodes in a radio access network using information to be used by the one or more network nodes to determine whether an event detected by the one or more network nodes and associated with the radio access network should be reported. Another method includes configuring a network node in a radio access network using information to be used by the network node to determine whether an event detected by the network node and associated with the radio access network should be reported. Responsive to the configuring, the network node may or may not report the event. Apparatus, computer programs, computer program products, and communication systems are also disclosed.

17 Claims, 6 Drawing Sheets

(51) Int. Cl.
*H04W 24/04* (2009.01)
*H04W 24/08* (2009.01)

(58) Field of Classification Search
USPC .......... 370/230, 241, 242; 455/411.423, 507
See application file for complete search history.

(56) References Cited

U.S. PATENT DOCUMENTS

| | | | | |
|---|---|---|---|---|
| 6,768,719 | B1* | 7/2004 | Couaillet | H04W 24/00 370/216 |
| 6,775,236 | B1 | 8/2004 | Scrandis et al. | 370/241 |
| 7,257,744 | B2 | 8/2007 | Sabet et al. | 714/56 |
| 8,780,732 | B2* | 7/2014 | Song | H04W 24/02 370/216 |
| 2001/0033662 | A1* | 10/2001 | Nishikawa | 380/262 |
| 2005/0192001 | A1* | 9/2005 | Samuel | H04W 24/00 455/423 |
| 2005/0221797 | A1* | 10/2005 | Howard | 455/411 |
| 2006/0092861 | A1* | 5/2006 | Corday et al. | 370/256 |
| 2007/0183418 | A1 | 8/2007 | Riddoch et al. | 370/389 |
| 2007/0253021 | A1* | 11/2007 | Mehta | A61B 5/0002 358/1.15 |
| 2007/0282492 | A1* | 12/2007 | Valovage et al. | 701/3 |
| 2008/0004035 | A1* | 1/2008 | Atkins | H04L 41/142 455/454 |
| 2008/0159236 | A1* | 7/2008 | Ch'ng | H04W 16/16 370/335 |
| 2009/0005029 | A1* | 1/2009 | Wang et al. | 455/423 |
| 2009/0036116 | A1* | 2/2009 | Kim | H04W 24/10 455/423 |
| 2009/0292951 | A1 | 11/2009 | Fournier et al. | 714/37 |
| 2010/0100775 | A1 | 4/2010 | Slutsman et al. | 714/47.2 |
| 2010/0112953 | A1* | 5/2010 | Harris | 455/65 |
| 2010/0185901 | A1* | 7/2010 | Hirsch | H04L 12/2697 714/48 |
| 2010/0299419 | A1* | 11/2010 | Ramankutty | H04W 24/02 709/221 |
| 2011/0111700 | A1* | 5/2011 | Hackett | 455/41.2 |
| 2011/0201279 | A1* | 8/2011 | Suzuki et al. | 455/67.11 |
| 2011/0223918 | A1* | 9/2011 | Dahlen | H04W 24/00 455/436 |
| 2011/0287793 | A1* | 11/2011 | Tenny et al. | 455/507 |
| 2012/0071085 | A1* | 3/2012 | Gunnarsson | H04W 24/00 455/7 |
| 2012/0106329 | A1* | 5/2012 | Ahmed et al. | 370/230 |
| 2012/0106356 | A1* | 5/2012 | Johansson et al. | 370/241.1 |
| 2012/0108232 | A1* | 5/2012 | Viering et al. | 455/424 |
| 2012/0309404 | A1* | 12/2012 | Suzuki et al. | 455/450 |
| 2013/0077565 | A1* | 3/2013 | Jacobs et al. | 370/328 |

FOREIGN PATENT DOCUMENTS

| | | | |
|---|---|---|---|
| JP | 2007184937 A | 7/2007 | |
| JP | 2009151429 A * | 7/2009 | |
| PL | WO 2011050846 A1 * | 5/2011 | ......... H04W 24/10 |
| WO | WO-95/32595 A1 | 11/1995 | |
| WO | WO 2011063418 A2 | 5/2011 | |
| WO | WO-2011/095884 A1 | 8/2011 | |
| WO | WO 2012055307 A1 | 5/2012 | |

OTHER PUBLICATIONS

3GPP TS 32.101 V10.0.0 (Sep. 2010) 3$^{rd}$ Generation Partnership Project; Technical Specification Group Services and System Aspects; Telecommunication Management; Principles and High Level Requirements (Release 9).

Nokia Siemens Networks: "Flexible policies for management of Heterogeneous Networks"; 3GPP Draft; S5-121366; 3rd Generation Partnership Project (3GPP); Mobile Competence Centre; 650, Route des Lucioles; F-06921 Sophia-Antipolis Cedex; France; vol. SA WG5, May 11, 2012 (May 11, 2012); XP050647626; [retrieved on May 11, 2012] the whole document.

Tang, Z., et al.; "Building Practical self organization networks on Heterogeneous wireless modems"; Jun. 30, 2011; pp. 388-393; IEEE Computer Society; 2011 Fifth International Conference on Innovative Mobile and Internet Services in Ubiquitous Computing (IMIS).

* cited by examiner

FAULT MANAGEMENT TRAFFIC REDUCTION IN HETEROGENEOUS NETWORKS

CROSS-REFERENCE TO RELATED ED APPLICATIONS

The present application claims the benefit under 35 U.S.C. §119(e) of U.S. Provisional Patent Application No. 61/541,229, filed on Sep. 30, 2011, the disclosure of which is hereby incorporated by reference in its entirety.

TECHNICAL FIELD

This invention relates generally to heterogeneous network (HetNets) and, more specifically, relates to fault management (FM) in HetNets.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

In a Heterogeneous Network (HetNet) deployment scenario, the number of network nodes is expected to be significantly larger than in a traditional network. A HetNet is a network comprising radio access nodes of varying sizes. Such nodes typically include "small" base stations serving "smaller" cells such as femto and micro cells and "large" base stations serving "larger", macro cells. The smaller and larger cells overlap, and typically there are multiple smaller cells for every larger cell. In a HetNet scenario, a large number of small(er) network nodes (for example, an eNodeB) are deployed with high density in order to either improve the coverage or improve the capacity or both.

With the high density of deployment in a HetNet, certain fault events (such as power outage, backhaul failure, interference, thermal events, and the like) may affect a large number of nodes, resulting in flood of alarms. Thus, the increased number of nodes in a HetNet as compared to traditional macro cells will result in significant increase of management traffic, resulting in increased costs (capital expenditures, CAPEX, and operational expenditures, OPEX) to the network operator.

SUMMARY

This section contains examples of possible implementations and is not meant to be limiting.

An exemplary embodiment is a first method that includes configuring one or more network nodes in a radio access network using information to be used by the one or more network nodes to determine whether an event detected by the one or more network nodes and associated with the radio access network should be reported.

Another exemplary embodiment is a first apparatus including means for configuring one or more network nodes in a radio access network using information to be used by the one or more network nodes to determine whether an event detected by the one or more network nodes and associated with the radio access network should be reported. A further exemplary embodiment includes an operations and maintenance entity including the first apparatus.

A further exemplary embodiment is an exemplary apparatus including one or more processors and one or more memories including computer program code. The one or more memories and the computer program code are configured to, with the one or more processors, cause the apparatus to perform at least the following: configuring one or more network nodes in a radio access network using information to be used by the one or more network nodes to determine whether an event detected by the one or more network nodes and associated with the radio access network should be reported.

An exemplary computer program product is disclosed that includes a computer-readable medium bearing computer program code embodied therein for use with a computer, the computer program code including: code for configuring one or more network nodes in a radio access network using information to be used by the one or more network nodes to determine whether an event detected by the one or more network nodes and associated with the radio access network should be reported.

Another exemplary embodiment is a second method including configuring a network node in a radio access network using information to be used by the network node to determine whether an event detected by the network node and associated with the radio access network should be reported.

Another exemplary embodiment is a second apparatus including means for configuring a network node in a radio access network using information to be used by the network node to determine whether an event detected by the network node and associated with the radio access network should be reported. A further exemplary embodiment includes a base station including the second apparatus.

An exemplary apparatus includes one or more processors and one or more memories including computer program code. The one or more memories and the computer program code are configured to, with the one or more processors, cause the apparatus to perform at least the following: configuring a network node in a radio access network using information to be used by the network node to determine whether an event detected by the network node and associated with the radio access network should be reported.

A further exemplary embodiment is an exemplary computer program product including a computer-readable medium bearing computer program code embodied therein for use with a computer, the computer program code including: code for configuring a network node in a radio access network using information to be used by the network node to determine whether an event detected by the network node and associated with the radio access network should be reported.

Another exemplary embodiment is a computer program including program code for executing the method according to any of the first or second methods. An additional exemplary embodiment includes a computer program according to this paragraph, wherein the computer program is a computer program product including a computer-readable medium bearing computer program code embodied therein for use with a computer.

Another exemplary embodiment is a communication system including the apparatus in accordance with any of the apparatus of the previous paragraphs.

DETAILED DESCRIPTION OF THE DRAWINGS

As described above, in a HetNet scenario, because of a high density of deployment of base stations, certain fault events (such as power outage, backhaul failure, interference, thermal events, and the like) may affect a large number of nodes, resulting in a flood of alarms. The instant invention solves or ameliorates the problem of reducing the amount of management traffic, fault management (FM) in particular, without impacting the capabilities for alarm reporting, correlation, and analysis.

Figure 1:
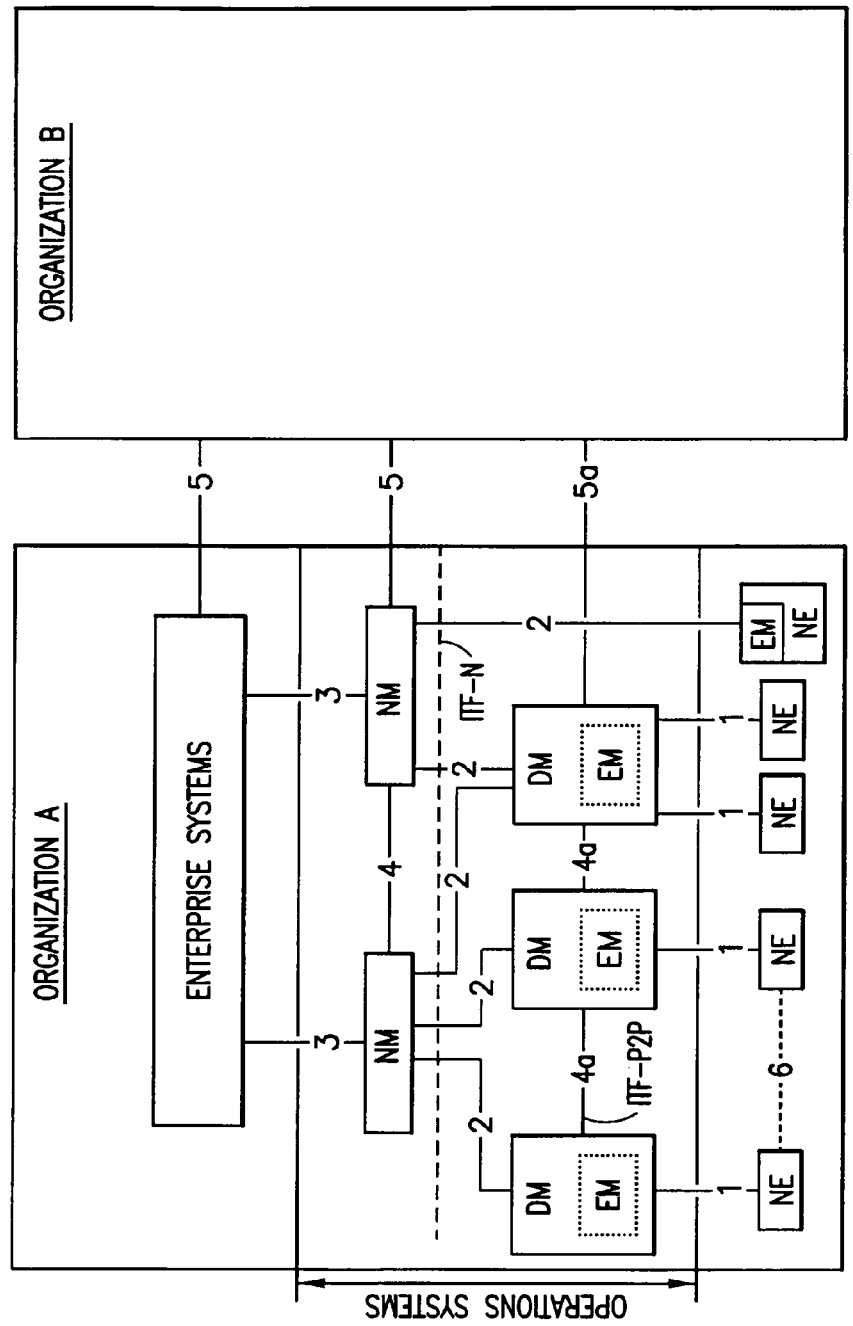
FIG. 1 is a block diagram of a management reference model from FIG. 1 of third generation partnership project (3GPP) technical standard (TS) 32.101 V10.0.0 (2010-09), and is used to illustrate locations for possible reduction in traffic of the exemplary embodiments of the instant invention.

Before proceeding with more detailed description of the exemplary embodiments, reference is now made to FIG. 1. This figure is a block diagram of a management reference model from FIG. 1 of third generation partnership project (3GPP) technical standard (TS) 32.101 V10.0.0 (2010-09), and is used to illustrate locations for possible reduction in traffic of the exemplary embodiments of the instant invention. FIG. 1 shows an Organization A having Enterprise Systems connected through Type 3 interfaces to network managers (NMs). The NMs connect to the domain managers (DMs) via Type 2 interfaces. The Type 2 interfaces also include an N interface (Itf-N), which is a management interface. The DMs connect to each other through a management point-to-point (P2P interface (itf) (itf-P2P 4a). The DMs connect to the network nodes (NEs) via Type 1 interfaces. The exemplary embodiments of the instant invention should reduce traffic due to fault management (FM) on at least the Type 1 and Type 2 interfaces. The EMs are element managers. The NMs provide a package of end-user functions with the responsibility for the management of a network, mainly as supported by the EM(s), but the NMs may also provide direct access to the NEs. The NMs also provide operations and maintenance (O&M) support for a network. It is noted that O&M is also called operations, administration, and maintenance (OA&M) and operations, administration, maintenance and provisioning (OAM&P). NM provides O&M support for a network, DM for a domain, EM for an element or group of elements. So, the O&M system referred to herein is one or more of EM, DM, or NM or a similar server such as HMS or H(e)MS for femtos. HMS is an HNB (home NodeB) management system. The H(e)MS is a home NodeB management system or a home eNodeB management system, where H(e)NB is a home NodeB or home eNodeB.

Exemplary embodiments herein use specific configuration rules to reduce the rate of alarm traffic (such as fault management traffic) transmitted by network nodes detecting the events within a cellular network to an O&M entity. In an exemplary embodiment, an O&M distributed system is disclosed for controlling O&M traffic, where an O&M entity configures individual network nodes with a "probability of reporting" (for example, [0.1], zero to one inclusive) attribute for certain event types. Whenever a reportable event occurs, a particular node will not always report the event, but instead will use the pre-configured probability to determine whether to report the event or not report the event. The achieved result should be that when a particular event type affects multiple network nodes, only a certain subset of all the network nodes will report occurrence of the event. The configurable attribute ensures that overall number of reported alarms is reduced (from a maximum number), but is also sufficient enough to report the alarm (e.g., is above a minimum number) to the O&M system. The configurable attribute may suitably be per event type (for example, a table/matrix). It is noted that an event type includes alarms or any other item that would be reportable to an O&M system.

An example of implementation of the probability of reporting is to pre-configure the individual network nodes with the same common random seed as the attribute that will be used by the network nodes to decide whether to report a particular alarm in a "random" (e.g., pre-determined by the seed) round-robin fashion. Use of a common random seed allows the network nodes a more controlled way to decide whether to report a particular alarm.

Figure 2:
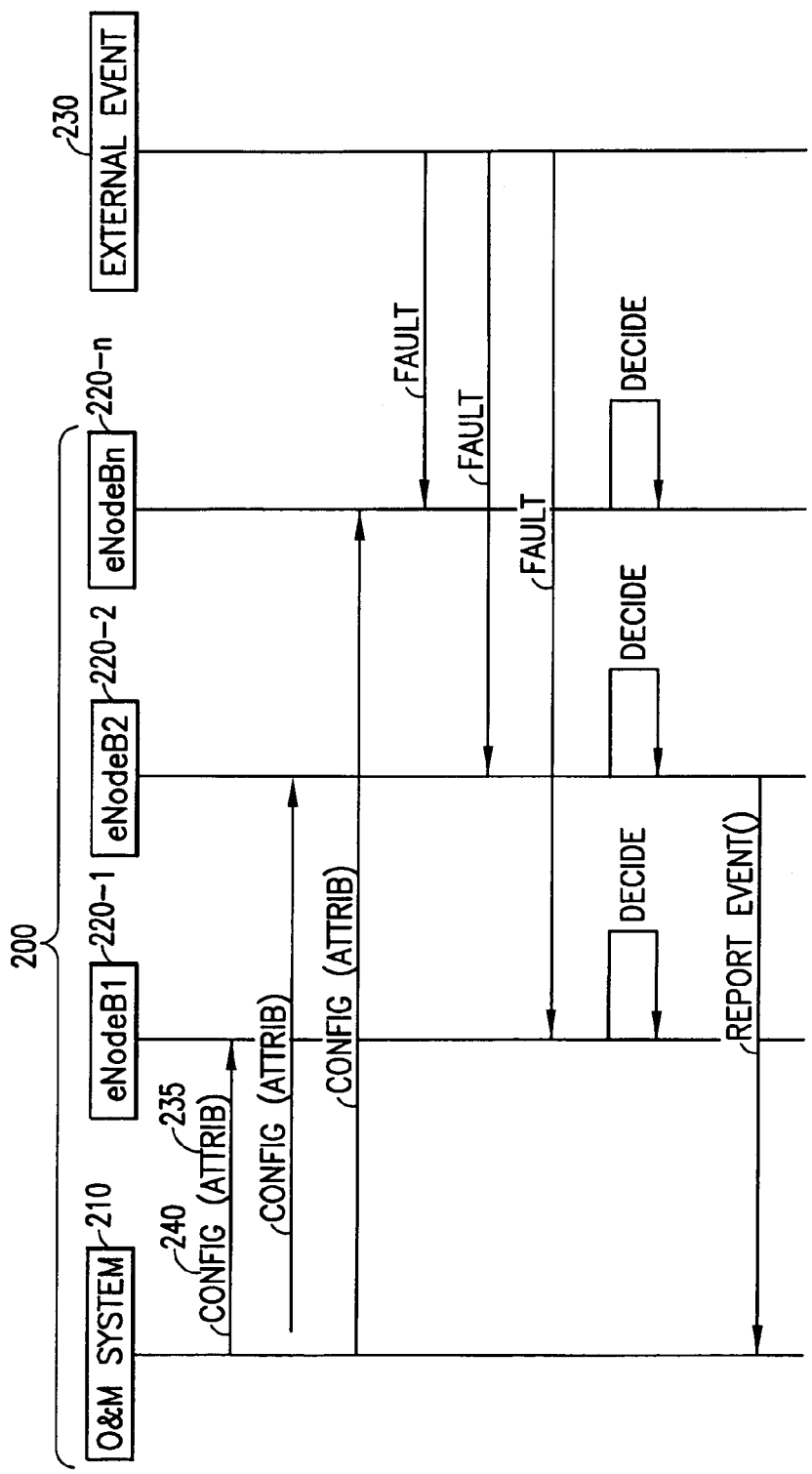
FIG. 2 is an example of a sequence diagram for a probability of reporting scenario.

Turning to FIG. 2, an example is shown of a sequence diagram for a probability of reporting scenario. In this example, the O&M system 210 configures n eNodeBs 220-1 through 220-n. The eNodeBs 220 are evolved Node Bs, which are also referred to as E-UTRAN Node Bs, where E-UTRAN is evolved-universal terrestrial radio access network. The eNodeBs are base stations that provide wireless access by user equipment (not shown in this figure, but see FIG. 6) to the radio access network comprising the O&M system 210 and the eNodeBs 220. The eNodeBs 220 are the network entities shown in FIG. 1. In FIG. 2, there is also an "external event" 230, which includes, e.g., a power outage, backhaul failure, interference, thermal events, and the like. The radio access network 200 includes the O&M system 210 and the eNodeBs 220, along with other entities not shown. The O&M system 210 may be any entity, such as a server, in the radio access network 200 that can configure network nodes and receive reports of events occurring in the radio access network. The term "external" is used herein for an event to indicate that this event may affect multiple network nodes, whereas an "internal" event may only affect a single network node. However, the use of the term "external" is only exemplary, because in, e.g., a daisy-chain configuration, an "internal" event (e.g., a failed interface) in one of the network nodes may affect many other network nodes.

In the example of FIG. 2, the O&M system 210 configures n eNodeBs 220-1 through 220-n via a configuration message 240 having an attribute (attrib) 235. The attribute may be, e.g., a probability value or a common random seed. The external event 230 occurs and reports a fault to each of the eNodeBs 220. Each of the eNodeBs 220 performs a decide process using the attribute 235. In one example, each eNodeB 220 generates a random number (e.g., between zero and one) and the random number is compared with the probability value as a criterion. If the random number meets the criterion (e.g., is above the probability), the eNodeB 220 reports the event via a ReportEvent( ) message. For the common random seed example, each eNodeB 220 generates (in the decide process) another random value in a sequence of random numbers using the common random seed and a pseudorandom number generator. If the random value meets a criterion (e.g., is above a threshold), the eNodeB 220 reports the event via a ReportEvent( ) message.

It can be seen that only one of the three eNodeBs 220 reports the event 230 via a ReportEvent( ) message. Since at least three eNodeBs 220 received indication of the external event 230, in a typical system, all three eNodeBs 220 would report the event. Thus, FIG. 2 illustrates a large savings in reporting traffic.

Figure 3:
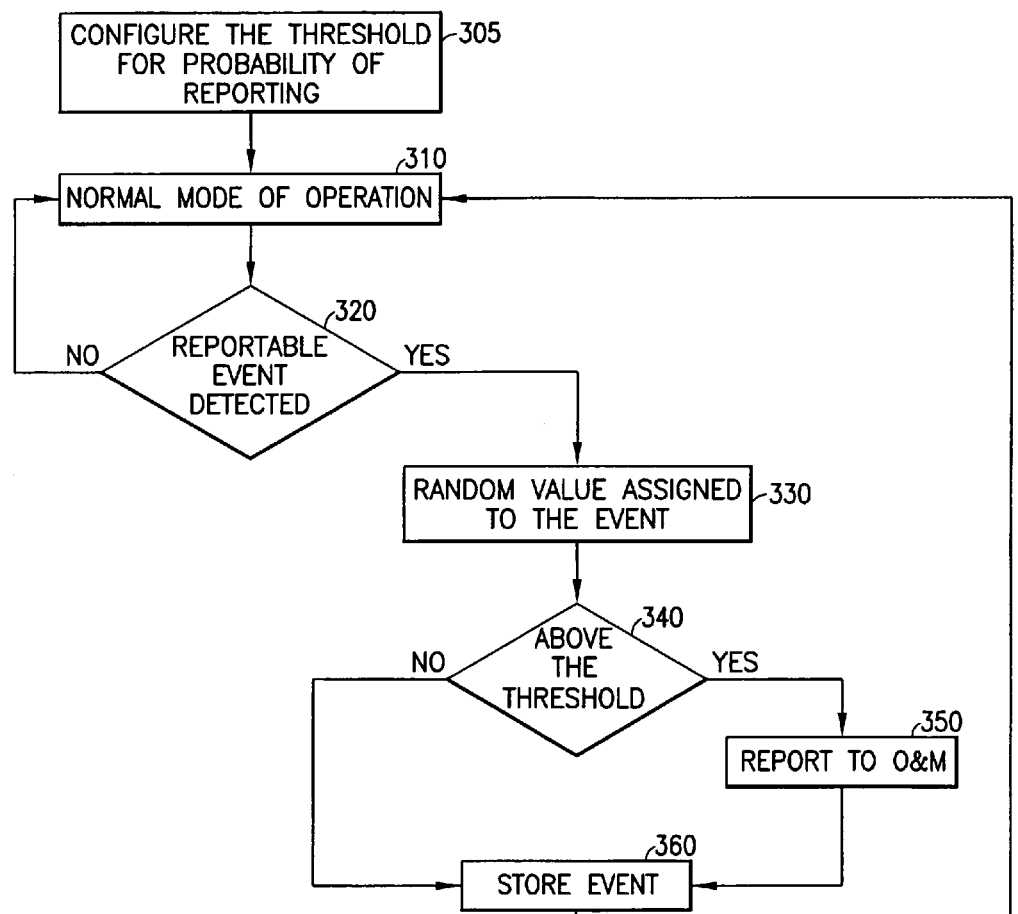
FIG. 3 illustrates a flow chart of an exemplary method for the probability of reporting scenario illustrated in FIG. 2.

Referring now to FIG. 3, this figure illustrates a flow chart of an exemplary method for the probability of reporting scenario illustrated in FIG. 2. This method is performed by an individual one of the eNodeBs 220 and may be performed by software executed by hardware, by hardware (such as an integrated circuit) configured to perform the illustrated operations, or by a combination of these.

The method begins in block 305, where a threshold for probability of reporting is configured. If the attribute 235 is a probability value, the probability value may be used as the threshold (e.g., a probability of reporting is the threshold). If the attribute 235 is the common random seed, the threshold may be preconfigured or also communicated in the configuration message 240. In block 310, the eNodeB 220 performs a normal mode of operation. In block 320, it is determined if a reportable event has occurred. If no reportable event has occurred (block 320=No), the method continues in block 310.

If a reportable event has occurred (block 320=Yes), in block 330, a random value is assigned to the event. For the case where the attribute 235 is a probability value, the eNodeB determines the random value using a pseudorandom number generator using a seed chosen by the eNodeB. If the attribute 235 is the common random seed, the eNodeB 220 generates the random value by using a pseudorandom generator previously seeded with the common random seed. As is known, if all of the eNodeBs 220 use the same pseudorandom generator and the same common random seed, each of the eNodeBs 220 will then generate the same sequence of pseudorandom numbers. However, in one example, it is assumed that each eNodeB 220 will be configured at different times and each will potentially receive different numbers of faults at different times. Therefore, the actual random values from the sequence of random values selected by a set of multiple eNodeBs 220 from an external event 230 should have enough differences that only a subset of the eNodeBs 220 will report the event.

An example of how this exemplary embodiment might work is as follows. Each node in a cluster (e.g., group of nodes) is configured with the same common "random seed" as a configuration parameter, together with a "node ID" (where ID is identification) number (e.g., which may be a unique number of the node already used for other purposes) and "validity duration" for the currently generated random number (for example, one minute);

The RND( ) function at the node is initialized with the common "random seed". The seed here defines the sequence of random numbers generated by the function. Each random number generated by the function is between 0 and 1. So, an example of such sequence would look like "0.33, 0.21, 0.50, 0.15, 0.90, 0.12, 0.88, . . . " with the sequence long enough to be called "random". The sequence generated at each of the nodes should be the same.

To ensure that each node in the group determines a unique random number at any given time, the RND( ) function will also take, in an exemplary embodiment, the "node ID" parameter as an offset. So, for the first node (with ID=1) the offset is zero and the sequence of random numbers is "0.33, 0.21, 0.50, 0.15, 0.90, 0.12, 0.88, . . . ". For the second node (with ID=2) the offset is 1 and its sequence will be "0.21, 0.50, 0.15, 0.90, 0.12, 0.88, . . . ".

Similarly for the third node, the sequence will be "0.50, 0.15, 0.90, 0.12, 0.88, etc. . . . ". Thus, each node uses the same sequence, but uses different offsets. To ensure that individual random sequences are synchronized, the random sequence "starts" at a known synchronized time on all nodes (similar to the Unix time format represented in number of seconds elapsed from Jan. 1, 1970). The sequence position for each individual node is then a sum of (number of "validity duration" intervals elapsed from the common "start" time) plus (the "node ID").

Having the "common random seed" allows detection of abnormalities in FM reporting, as the operator may predict which node(s) should have reported certain events at certain times and notice if any reports are missing. For the probability value example, there is less control by the O&M system 210 as to how often any single eNodeB 220 reports an event and whether any reports are missing.

In block 340, it is determined if the random value is above the threshold. It is noted that the threshold for the common random seed embodiments can be predetermined or also included as part of the configuration message. If the random value is not above the threshold (block 340=No), the event is stored in block 360. If the random value is above the threshold (block 340=Yes), the event is reported (block 350) to the O&M system 210 (e.g., via the ReportEvent( ) message of FIG. 2).

It is noted that the examples presented in FIGS. 2 and 3 are relatively simplistic in terms of event type. However, the attribute 235 may be more complex and may include information about event types, so that configuration of the eNodeBs 220 depends on the event type. For instance, based on the configured attributes, the eNodeB 220-2 would be more likely to report on events for one event type (e.g., power loss), while eNodeB 220-*n* would be more likely to report on events for a different event type (e.g., thermal events).

Another set of exemplary embodiments is now disclosed for using specific configuration rules to reduce the rate of alarm traffic (such as fault management traffic) transmitted by network nodes detecting the events within a cellular network to an O&M entity. In this set of embodiments, a random (e.g., configurable) delay is introduced between event detection and reporting the event to network nodes that are peers of the network node detecting the event, if reporting of the event has not yet been received from a peer network node. In terms of network nodes as eNodeBs 220, these are interconnected through a network implementing, e.g., an X2 interface.

In this example, the O&M system 210 configures the individual eNodeBs 220 to forward the alarm being reported not only to the O&M system, but also to peer network nodes of the individual eNodeBs 200 (for example, via X2 links), while introducing a random (e.g., configurable) delay between event detection and reporting.

Whenever a reportable event occurs, a particular network node will not report the event immediately, but rather will wait a random delay (for example, [0 . . . <max1>], zero to the value max1, inclusive). The random delay may be, e.g., in units of minutes, seconds, or milliseconds, but this depends on the needs of the operator. If the network node does not receive similar reports of the event by its peers during this wait period, the network node will report the event to the O&M system 210, and typically also to peers of the network node. The alarm reports received from peers may be stored for a duration of <max2>. The duration may be in minutes, seconds, milliseconds, but may also be in days, depending on the needs of the operator and available storage space in the network node. Therefore if a similar event is detected locally before a report of the event is received from a peer and a timer corresponding to the duration of max2 expires, the network node will not report the event to the O&M system 210.

Figure 4:
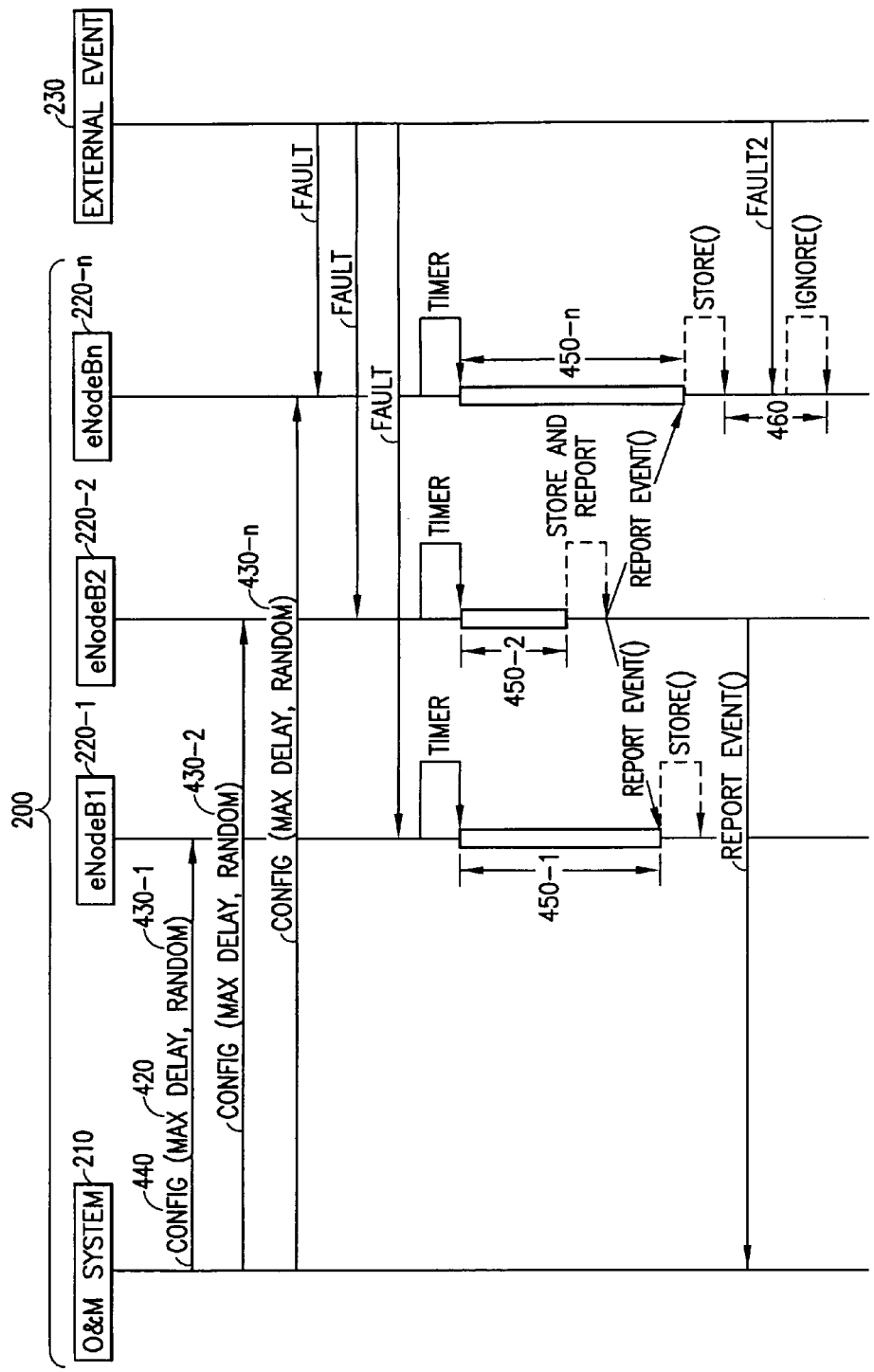
FIG. 4 is an example of a sequence diagram for a delayed reporting scenario.

Turning to FIG. 4, this figure is an example of a sequence diagram for a delayed reporting scenario. In this example, the O&M system 210 configures each of the eNodeBs 220 using a configuration message 440 having a maximum delay (maxDelay) value 420 and a random seed 430 (e.g., 430-1, 430-2, or 430-n). In response to determination of an external event 230, each of the eNodeBs 220 determining the event has occurred sets a timer for a time period 450 corresponding to the maxDelay 420 and the random seed 430. In one example, the random time period 450 is equal to the maxDelay value 420 multiplied by RND (common random seed 430, sequence step), where RND ( ) returns a sequence of values between zero and one and sequence step selects one of the sequence values (e.g., if there 100 sequence values, a sequence step of 100 could select the one hundredth value). The common random seed 430 is configured for each eNodeB 220. In one example, each eNodeB 220 is assigned a different, unique sequence step, which should mean that each eNodeB 220 determines a different random value. This assigned sequence step could be pre-assigned, or could be assigned in the configuration message 440. The techniques described above using the node ID are one exemplary option for ensuring each node determines a unique random number at any given time, although other techniques are possible.

In another example, the random seed 430 is a different random seed 430 for each eNodeB 220. In this example, the sequence step is not unique. The common random seed provides more certainty as described above. In particular, since the sequence step is unique, it is unlikely two network nodes 220 would randomly select the same time period and therefore it is unlikely that a collision occurs in terms of two network nodes 220 reporting the same event to the O&M system 210 and peer nodes. It is more likely if the random seeds 430 are not common (at least some are different) that a collision would occur. However, even if one or more collisions occur, there still should be fewer events reported that if all the network nodes report the events.

In the example of FIG. 4, the time period 450-2 is smallest, and the eNodeB 220-2 does not receive a report of the event from its peer eNodeBs 220-1 and 220-n. Therefore, the eNodeB 220-2 performs a StoreAndReport( ) process, where the event is stored for a time period corresponding to the maxDelay 420. The eNodeB 220-2 reports the events to its peer eNodeBs 220-1 and 220-n via ReportEvent( ) messages. The eNodeB 220-2 also reports the event to the O&M system 210 via a ReportEvent( ) message. The eNodeBs 220-1 and 220-N, because each has received a report of the event prior to the end of the respective time period 450-1 or 450-n, do not report the event to other peers and instead store (for the duration maxDelay 420) the report of the event.

Also shown in FIG. 4 is the time period 460, which is based on (or is equivalent to) the max2 duration described above. The configuration message 440 can therefore contain an indication of the max2 duration. In this example, another event 230 ("fault2") occurs within the time period 460, and this fault2 event is similar to the fault event (e.g., fault2 is a thermal event and fault is a thermal event). The eNodeB 220-n therefore ignores the fault2 event, e.g., via the Ignore( ) process.

Figure 5:
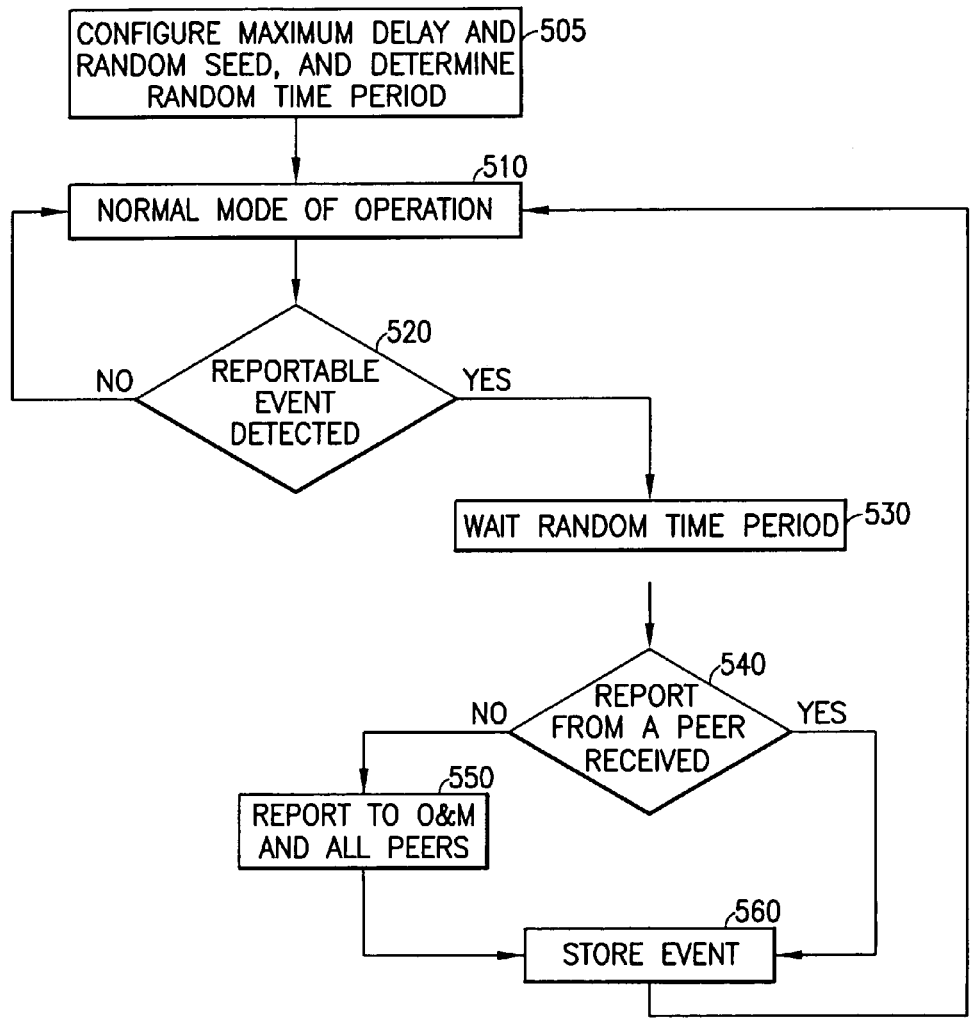
FIG. 5 illustrates a flow chart of an exemplary method for the delayed reporting scenario illustrated in FIG. 4.

Referring now to FIG. 5, this figure illustrates a flow chart of an exemplary method for the delayed reporting scenario illustrated in FIG. 4. This method is performed by an individual one of the eNodeBs 220 and may be performed by software executed by hardware, by hardware (such as an integrated circuit) configured to perform the illustrated operations, or by a combination of these.

In block 505, the eNodeB 220 configures maximum delay value 420 and the random seed 430, and determines the time period 450 using the same. It is noted that the node ID or other suitable information (e.g., to select uniquely the sequence step as described above) may also be configured and used to determine the time period 450. In block 510, the eNodeB 220 performs a normal mode of operation. In block 520, it is determined if a reportable event has occurred. If no reportable event has occurred (block 520=No), the method continues in block 510.

If a reportable event has occurred (block 520=Yes), in block 530, the eNodeB 220 waits a time period, e.g., by setting a timer with a value corresponding to the determined time period 450 and waiting until the timer expires. In block 540, it is determined whether the eNodeB 220 received a report of an event from a peer during the time period. If the eNodeB 220 did not receive a report of an event from a peer during the time period (block 540=No), the eNodeB 220 reports the detected event to the O&M system 210 and all peers of the eNodeB 220 (block 550). If the eNodeB 220 did receive a report of an event from a peer during the time period (block 540=Yes), in block 560, the eNodeB 220 stores the detected event.

It is noted that FIG. 5 does not address the duration max2 examples provided above. However, one skilled in the art should be able to determine how to modify FIG. 5 to include that embodiment, using the descriptions provided above.

Another set of exemplary embodiments is now disclosed for using specific configuration rules to reduce the rate of alarm traffic (such as fault management traffic) transmitted by network nodes detecting the events within a cellular network to an O&M entity. In this set of embodiments, a designated "reporter/master node" role is rotated across the members of a correlated cluster of network nodes over time. For instance, the O&M system 210 can designate a "reporter node", e.g., for each cluster of regular network nodes that are highly correlated in terms of fault management (e.g., same area, same uplink, same power source, and the like). Only the "reporter node" will report the events to the O&M system 210; all "regular" network nodes will just store the events internally. Multiple cases are possible here (as illustrated by the following non-limiting examples):

1) Only a reporter node is configured certain type of events (P=1, where P=probability of reporting), others are configured to stay silent (P=0). The reporter will only report the events that the reporter detected itself. The reporter role may rotate over time.

2) All nodes are configured to report to peers only, while one node (or some nodes) is configured to act as a reporter node. The reporter node will report the events that the reported node detected by itself and the events (e.g., correlated/consolidated or rate limited) that the reporter node received from peer nodes. The reporter role may rotate.

3) All nodes are configured to report only to a reporter node. The reporter node is configured to report to the O&M system the events that the reporter node detected itself as well as the events reported by peer nodes (e.g., correlated/consolidated or rate limited).

The "reporter node" may be designated either per event type or per cluster of network nodes for all event types. In a more general case, the clusters may be identified per event type (e.g., using different correlation criteria). That is, assume there is a set of nodes numbered 1-100. While performing correlation analysis in the O&M, an operator has determined that all of them typically may be equally affected by power outages (all in the "power" cluster). Interference usually affects either nodes 1-50 or 51-100 (two "interference" clusters). Thermal events (overheating) usually affect either even nodes or odd nodes (e.g., installed on the same side of the street and therefore exposed to sun), which corresponds to two "thermal" clusters. Then node 1 may be configured as a reporter in the power cluster, or in the first interference cluster or in the first thermal cluster. As another example, node 1 could be a reporter node in the power cluster, node 2 could be a reporter node in the first interference cluster, and node 3 could be a reporter node in the first thermal cluster. Many other combinations are possible.

As another example, the O&M system 210 may rotate the designated "reporter node" role across the members of a correlated cluster over time (e.g., according to a pre-configured time table or policy). This ensures that even if a "reporter node" fails, the events are still reported externally to the O&M system 210. There are multiple possibilities for rotation. As examples, the O&M system 210 could perform the rotation (e.g., by sending configuration messages) per the time table/policy, or the set of nodes could be configured with the time table/policy and the nodes rotate amongst themselves.

Individual network nodes will report their events to the designated "reporter node", which will perform event aggregation/correlation and will only report the unique/significant events externally.

It is also possible to pre-configure the individual network nodes with the same "common random seed" that will be used by the network nodes to decide which element is the current designated "reporter node" to report the aggregated/correlated alarms received from the peer network nodes. The common random seed, as described above, may also be used with unique (e.g., on a per-network-node basis) information (such as the node ID described above), so that each network node selects a unique random number from a random number generator that uses the random seed.

Although description above centered mainly on explicit messaging-type of configuration of the eNodeBs 220, the configuration of network nodes such as eNodeBs 220 may also be performed though one or more configuration files, one or more policies, or the like. That is, the network node may access the one or more configuration files or one or more policies and configure itself based on the information in the configuration file(s) or policy/policies.

As form of an example, it is anticipated by the instant invention different modes of operation, e.g. active and passive mode, according to IRPManager (e.g., an NM in FIG. 1) policies on the node/cell level may be implemented.

Actions of the policies anticipate capabilities including the following non-limiting list: creation, modification, and deletion of polices, configuring the probability of event (e.g., alarm) reporting by individual network elements for specific event (e.g., alarm) types, setting random delay boundaries between alarm detection and forwarding, enabling individual network elements for alarm forwarding to the peer nodes, designating selected network elements as "reporter nodes" responsible for reporting specific type of events, identifying selected groups of network elements for rotation of the "reporter node" role over time.

The following are exemplary use cases. With a high density of deployment certain fault events (such as power outage, backhaul failure, interference, thermal events, and the like) may affect large number of nodes resulting in flood of alarms. It should be possible for an operator to configure specific rules to reduce the rate of alarms/fault management traffic by elements detecting the events within a cellular network, through one or more of the following non-limiting examples.

An operator pre-configures individual nodes with "probability of reporting" (for example, [0 . . . 1]) attributes for certain alarm/event types. Whenever a reportable event occurs, a particular node won't always report the event, but will use the pre-configured probability to determine whether to report the event or not. The achieved result is that when a particular event type affects multiple nodes, only certain subset of nodes will report an alarm. The configurable attribute ensures that the overall number of reported alarms is reduced (e.g., to a maximum number), but is sufficient enough to report the alarm (e.g., a minimum number) to the O&M system. The configurable attribute is essentially per alarm/event type (for example, a table/matrix).

An operator pre-configures individual nodes with boundaries for a random delay between alarm detection and forwarding alarm to the peer nodes (for example, via X2 links), if an alarm has not yet been received from a peer node. Whenever a reportable event occurs, a particular node won't report the event immediately, but rather wait a random time (for example, [0 . . . <max1>]) and if the node does not receive similar alarms reported by its peers during this wait period, report the event to the O&M system. The alarm reports received from peers may be stored (for example, for a duration of <max2>), therefore if a similar event is detected locally before the report received from a peer expires, the event won't be reported to the O&M system.

An operator pre-configures selected individual nodes with a "reporter/master node" role across the members of a correlated cluster over time. Only the "reporter node" will report the alarms to the O&M system, all "regular" nodes will just store the alarms internally. The "reporter node" may be designated either per alarm type, or just per cluster of nodes for all alarm types. In a more general case, the clusters may be identified per alarm type (different correlation criteria). The "reporter" role may rotate among the members of pre-defined cluster over time.

In terms of business level requirements, operators should be able to configure specific rules to reduce the rate of alarms/fault management traffic by elements detecting the events within a cellular network.

With regard to specification level requirements, the following are possible examples:

An IRPAgent (e.g., an EM or NE in FIG. 1) should support the capability to allow the IRPManager to configure the probability of alarm/event reporting by individual network elements for specific alarm/event types.

The IRPAgent should support the capability to allow the IRPManager to configure the random delay boundaries between alarm detection and forwarding.

The IRPAgent should support the capability to allow the IRPManager to configure individual network elements for alarm forwarding to the peer nodes.

The IRPAgent should support the capability to allow the IRPManager to configure selected network elements as "reporter nodes" responsible for reporting specific type of events/alarms.

The IRPAgent shall support the capability to allow the IRPManager to configure selected groups of network elements for rotation of the "reporter node" role over time.

Figure 6:
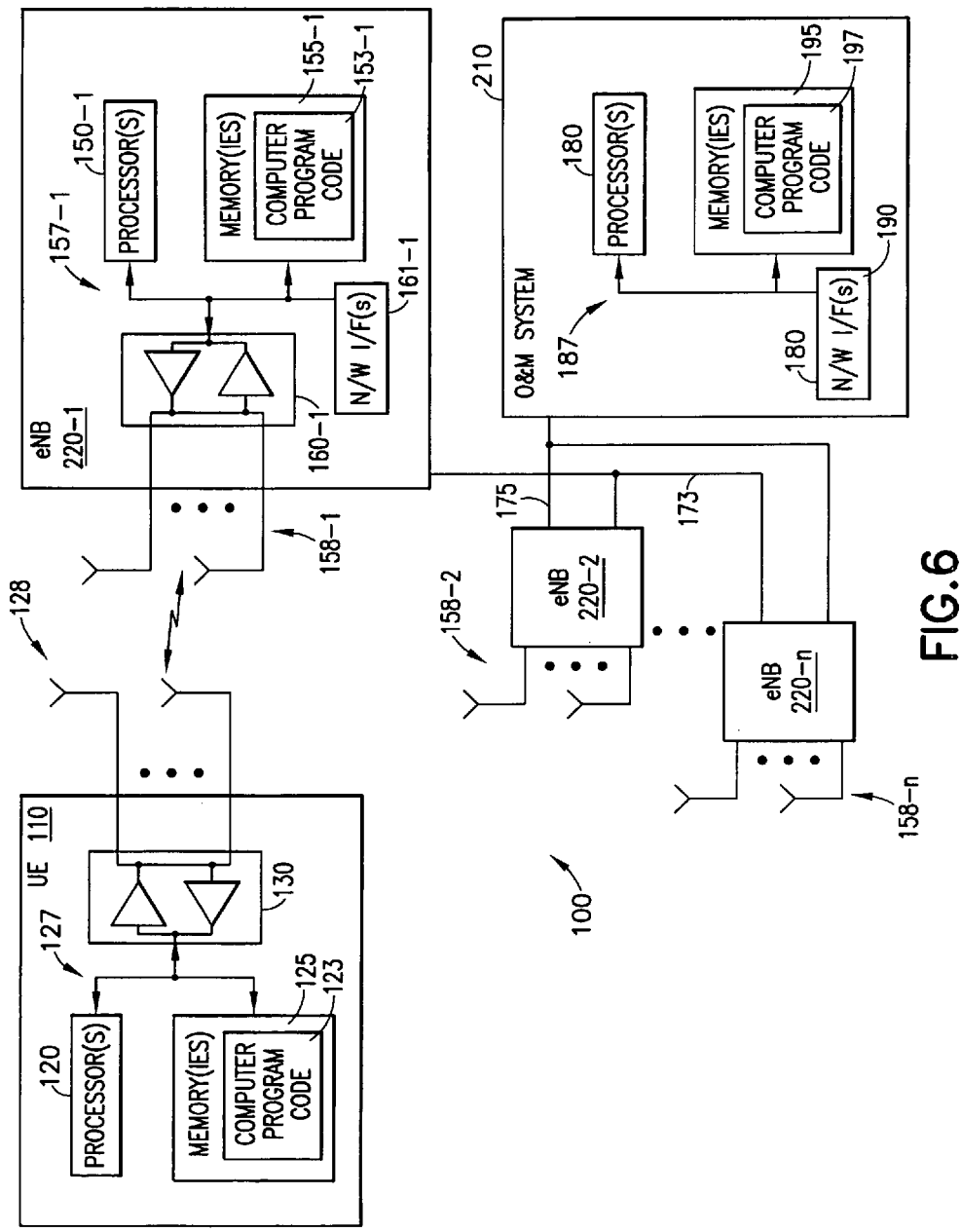
FIG. 6 illustrates an exemplary system in which the exemplary embodiments of the instant invention may be practiced.

FIG. 6 illustrates an exemplary system in which the exemplary embodiments of the instant invention may be practiced. In FIG. 6, a user equipment (UE) 110 is in wireless communication with a radio network 100. The user equipment 110 includes one or more processors 120, one or more memories 125, and one or more transceivers 130 interconnected through one or more buses 127. The one or more transceivers 130 are connected to one or more antennas 128. The one or more memories 125 include computer program code 123. The one or more memories 125 and the computer program code 123 are configured to, with the one or more processors 120, cause the user equipment 110 to perform one or more of the operations as described herein.

The radio network 100 includes n eNodeBs (eNBs) 220-1, 220-2, and 220-n and O&M system 210. The internal elements of eNodeB 220-1 will be described herein, and it is assumed the eNodeBs 220-2 and 220-n are similar. The eNodeB 220-1 includes one or more processors 150-1, one or more memories 155-1, one or more network interfaces (N/W I/F(s)) 161-1, and one or more transceivers 160-1 interconnected through one or more buses 157-1. The one or more transceivers 160-1 are connected to one or more antennas 158-1. The one or more memories 155-1 include computer program code 153-1. The one or more memories 155-1 and the computer program code 153-1 may be configured to, with the one or more processors 150-1, cause the eNodeB 220-1 to perform one or more of the operations as described herein. The one or more network interfaces 161-1 communicate over networks such as the networks 173, 175.

The O&M system 210 includes one or more processors 180, one or more memories 195, and one or more network interfaces (N/W I/F(s)) 190 interconnected through one or more buses 187. The one or more memories 195 include computer program code 197. The one or more memories 195 and the computer program code 197 may be configured to, with the one or more processors 180, cause the O&M system 210 to perform one or more of the operations as described herein. The one or more network interfaces 190 communicate over networks such as the networks 173, 175.

The eNodeBs 220 communicate using, e.g., network 173. The network 173 may be wired or wireless or both and may implement, e.g., an X2 interface. The O&M system uses the network 175 to communicate with the eNodeBs 220. The network 175 may be wired or wireless or both and may implement, e.g., a Type 1 or Type 2 interface (see FIG. 1).

The computer readable memories 155 and 195 may be of any type suitable to the local technical environment and may be implemented using any suitable data storage technology, such as semiconductor based memory devices, flash memory, magnetic memory devices and systems, optical memory devices and systems, fixed memory and removable memory. The processors 150 and 180 may be of any type suitable to the local technical environment, and may include one or more of general purpose computers, special purpose computers, microprocessors, digital signal processors (DSPs) and processors based on a multi-core processor architecture, as non-limiting examples.

Embodiments of the present invention may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 6. A computer-readable medium may comprise a computer-readable storage medium (e.g., memory 150, 195 or other device) that may be any media or means that can contain or store the instructions for use by or in connection with an instruction execution system, apparatus, or device, such as a computer.

Exemplary embodiments include the following. 1. A method includes: configuring one or more network nodes in a radio access network using information to be used by the one or more network nodes to determine whether an event detected by the one or more network nodes and associated with the radio access network should be reported.

2. The method of item 1, wherein the information comprises a probability value to be used by a selected one of the one or more network nodes for comparison with a randomly generated value to determine whether the detected event should be reported by the selected network node.

3. The method of item 1, wherein:
the one or more network nodes comprise a plurality of network nodes; and
the information comprises a plurality of probability values, each of the plurality of probability values to be used by a respective one of the plurality of network nodes for comparison with a randomly generated value to determine whether the detected event should be reported by the respective network node.

4. The method of item 1, wherein the information comprises a common random seed to be used by a selected one of the one or more network nodes to generate a plurality of pseudorandom values, the common seed to be used by the selected network node to determine whether the detected event should be reported by the selected network node.

5. The method of item 1, wherein:
the one or more network nodes comprise a plurality of network nodes; and
the information comprises a common random seed for each of the plurality of network nodes, the common random seed to be used by each of the plurality of network nodes to determine a sequence of random values used to determine whether the detected event should be reported by the network node.

6. The method of item 5, wherein each of the plurality of network nodes is to use a value uniquely identifying the network node from others of the plurality of the network nodes to determine uniquely a starting point within a sequence of random values.

7. The method of item 1, wherein the information comprises at least one value to be used by a selected one of the one or more network nodes to set a delay used to report the detected event in response to the detected event not being reported to the selected network node by peers of the selected network node within the delay.

8. The method of item 7, wherein the information further comprises a maximum delay value to be used by the selected network node to determine a time period to store the detected event, the time period to be used by the selected network to determine whether a similar event to the detected event is determined by the selected network node to have occurred within the time period, and wherein the time period is to be used by the selected network node to determine not to report the similar event in response to the similar event occurring during the time period.

9. The method of item 1, wherein:

the one or more network nodes comprise a plurality of network nodes; and wherein the information comprises a plurality of at least one values, each of the plurality of at least one values to be used by a corresponding one of the plurality of network nodes to set a delay and where the corresponding network node is to report the detected event in response to the detected event not being reported to the corresponding network node by peers of the corresponding network node within the delay.

10. The method of item 9, wherein the corresponding node reports the detected event to one or both of the peer network nodes or at least one operations and management entity.

11. The method of item 1, wherein the information comprises information causing a selected one of the one or more network nodes to assume a reporter role and in the reporter role to report all detected events.

12. The method of item 11, wherein the information further comprises one or more indications of one or more event types for which the selected network node is to assume the reporter role and in the reporter role is to report all detected events having the one or more event types.

13. The method of item 1, wherein:

the one or more network nodes comprise a plurality of network nodes; and the information comprises information causing a selected one of the plurality network nodes to assume a reporter role and in the reporter role to report all detected events.

14. The method of item 13, wherein the reporter role is rotated amongst the plurality of network nodes.

15. The method of item 13, wherein the information for the selected network node further comprises one or more indications of one or more first event types for which the selected network node is to assume a reporter role and in the reporter role is to report all detected events having the one or more first event types, and wherein the information for an additional selected network node further comprises one or more indications of one or more second event types for which the additional selected network node is to assume a reporter role and in the reporter role is to report all detected events having the one or more second event types, and wherein the first event types and second event types are different.

16. The method of any one of the preceding items, wherein at least one operations and management entity configures the one or more network nodes using one or more configuration messages comprising the information.

17. The method of item of any one of items 1 to 15, further comprising accessing one or both of one or more configuration files or one or more policies comprising the information and performing the configuring using the accessed information.

18. The method of any one of the preceding items, wherein any detected events are reported to at least one operations and management entity.

19. A method, comprising:

configuring a network node in a radio access network using information to be used by the network node to determine whether an event detected by the network node and associated with the radio access network should be reported.

20. The method of item 19, wherein the information comprises a probability value, and wherein the method further comprises using by the network node the probability value for comparison with a randomly generated value to determine whether the detected event should be reported by the network node, and reporting by the network node the detected event in response to the comparison meeting a predetermined criterion.

21. The method of item 19, wherein the information comprises a random seed, and wherein the method further comprises the network node generating a plurality of pseudorandom values using the random seed and using the plurality of pseudorandom values to determine whether the detected event should be reported by the network node.

22. The method of item 21, wherein generating the plurality of pseudorandom values using the common random seed further comprises using a value uniquely defining the network node relative to other network nodes in a cluster of network nodes to determine a starting point within the plurality of pseudorandom values.

23. The method of item 19, wherein the information comprises at least one value, wherein the method further comprises the network node using the at least one value to set a delay and reporting the detected event in response to the detected event not being reported to the network node by peers of the network node within the delay.

24. The method of item 23, wherein the information further comprises a maximum delay value, and wherein the method further comprises the network node using the maximum delay value to determine a time period to store the detected event, using the time period to determine whether a similar event to the detected event is determined by the network node to have occurred within the time period, and determining not to report the similar event in response to the similar event occurring during the time period.

25. The method of item 19, wherein the information comprises information causing the network node to assume a reporter role, and wherein the method further comprises the network node reporting all detected events while in the reporter role.

26. The method of item 25, wherein the information further comprises one or more indications of one or more event types for which the network node is to assume the reporter role, and wherein reporting further comprises the network node reporting all detected events having the one or more event types.

27. The method of any one of items 25 or 26, further comprising the network node rotating the reporter role to another network node and wherein the network node no longer reports events after rotating.

28. The method of any one of items 19 to 27, wherein an operations and management entity configures the network node using one or more configuration messages comprising the information.

29. The method of any one of items 19 to 28, further comprising accessing one or both of one or more configuration files or one or more policies comprising the information and performing the configuring using the accessed information.

30. The method of any one of items 19 to 29, wherein any detected events are reported to at least one operations and management entity.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
one or more processors; and
one or more memories including computer program code,
the one or more memories and the computer program code configured, with the one or more processors, to cause the apparatus to perform at least the following:
configuring a plurality of base stations in a radio access network using information to be used by each base station of the plurality of base stations to determine whether an event detected by the base station and associated with the radio access network should be reported, wherein the configuring comprises configuring by using the information a common random seed at each base station that is common to every base station of the plurality of base stations, the common random seed to be used by each base station of the plurality of base stations to determine a sequence of random values used to determine whether the detected event should be reported by the base station to an operations and management entity, wherein each of the plurality of base stations is to use a value uniquely identifying the base station from others of the plurality of the base stations to determine uniquely a starting point within the sequence of random values to identify a random value to use to determine whether the detected event should be reported by the base station to the operations and management entity.

2. The apparatus of claim 1, wherein:
the information comprises a plurality of probability values, each of the plurality of probability values to be used by a respective one of the plurality of base stations for comparison with a randomly generated value to determine whether the detected event should be reported by the respective base station.

3. The apparatus of claim 2, wherein:
the randomly generated value is generated using the common random seed and the value uniquely identifying the respective base station from others of the plurality of the base stations, and wherein the randomly generated value is compared to a probability value used by the respective base station to determine whether the detected event should be reported by the respective base station.

4. The apparatus of claim 1, wherein the information comprises at least one value to be used by a selected base station of the plurality of base stations to set a delay used to report the detected event in response to the detected event not being reported to the selected base station by peers of the selected base station within the delay.

5. The apparatus of claim 1, wherein:
the information comprises information causing a selected one of the plurality of base stations to assume a reporter role and in the reporter role to report all detected events.

6. A method, comprising:
configuring a plurality of base stations in a radio access network using information to be used by each base station of the plurality of base stations to determine whether an event detected by the base station and associated with the radio access network should be reported, Wherein:
the configuring comprises configuring by using the information a common random seed at each base station that is common to every base station of the plurality of base stations, the common random seed to be used by each of the plurality of base stations to determine a sequence of random values used to determine whether the detected event should be reported by the base station to an operations and management entity, wherein each of the plurality of base stations is to use a value uniquely identifying the base station from others of the plurality of the base stations to determine uniquely a starting point within the sequence of random values to identify a random value to use to determine whether the detected event should be reported by the base station to the operations and management entity.

7. The method of claim 6, further comprising receiving one or more reports from the plurality of base stations, the one or more reports reported by the plurality of base stations based at least in part on the information.

8. An apparatus, comprising:
one or more processors; and
one or more memories including computer program code,
the one or more memories and the computer program code configured, with the one or more processors, to cause the apparatus to perform at least the following:
configuring a base station of a plurality of base stations in a radio access network using information to be used by each base station of the plurality of base stations to determine whether an event detected by the base station and associated with the radio access network should be reported,
wherein the configuring comprises configuring using the information at the base station a random seed that is common to every base station of the plurality of base stations in the radio access network,
wherein the one or more memories and the computer program code are further configured, with the one or more processors, to cause the apparatus to perform at least generating by the base station a plurality of pseudorandom values using the random seed and using the plurality of pseudorandom values to determine whether the detected event should be reported by the base station to an operations and management entity, wherein each of the plurality of base stations is to use a value uniquely identifying the base station from others of the plurality of the base stations to determine uniquely a starting point within the plurality of pseudorandom values to identify a random value to use to determine whether the detected event should be reported by the base station to the operations and management entity.

9. The apparatus of claim 8, wherein the information comprises at least one value, wherein the one or more memories and the computer program code are further configured, with the one or more processors, to cause the apparatus to perform at least the following: using by the base station the at least one value to set a delay and reporting the detected event in response to the detected event not being reported to the base station by peers of the base station within the delay.

10. The apparatus of claim 9, wherein the information further comprises a maximum delay value, and wherein the one or more memories and the computer program code are further configured, with the one or more processors, to cause the apparatus to perform at least the following: using by the base station the maximum delay value to determine a time period to store the detected event, using the time period to determine whether a similar event to the detected event is determined by the base station to have occurred within the time period, and determining not to report the similar event in response to the similar event occurring during the time period.

11. The apparatus of claim 8, wherein the information comprises information causing the base station to assume a reporter role, and wherein the one or more memories and the computer program code are further configured, with the one or more processors, to cause the apparatus to perform at least the following: reporting by the base station all detected events while in the reporter role.

12. The apparatus of claim 8, wherein the operations and management entity configures the base station using one or more configuration messages comprising the information.

13. The apparatus of claim 8, further comprising accessing one or both of one or more configuration files or one or more policies comprising the information and performing the configuring using the accessed information.

14. A method, comprising:
configuring a base station of a plurality of base stations in a radio access network using information to be used by each base station of the plurality of network access nodes to determine whether an event detected by the base station and associated with the radio access network should be reported, wherein:
the configuring comprises configuring using the information at the base station a random seed common that is to every base station of the plurality of base stations in the radio access network, the random seed to be used by each base station of the plurality of base stations; and
generating by the base station a plurality of pseudorandom values using the random seed and using the plurality of pseudorandom values to determine whether the detected event should be reported by the base station to an operations and management entity, wherein each of the plurality of base stations is to use a value uniquely identifying the base station from others of the plurality of the base stations to determine uniquely a starting point within the plurality of pseudorandom values to identify a random value to use to determine whether the detected event should be reported by the base station to the operations and management entity.

15. The method of claim 14, further comprising reporting by the base station the event in response to a determination, based at least on the information, that the event should be reported.

16. A computer program product comprising a non-transitory computer-readable storage medium bearing computer program code embodied therein for use with a computer, the computer program code comprising:
code for configuring a plurality of base stations in a radio access network using information to be used by each base station of the plurality of base stations to determine whether an event detected by the base station and associated with the radio access network should be reported, wherein the configuring comprises configuring using the information a random seed at each base station that is common to every base station of the plurality of base stations in the radio access network, the random seed to be used by each base station of the plurality of base stations to determine a sequence of random values used to determine whether the detected event should be reported by the base station to an operations and management entity, wherein each of the plurality of base stations is to use a value uniquely identifying the base station from others of the plurality of the base stations to determine uniquely a starting point within the sequence of random values to identify a random value to use to determine whether the detected event should be reported by the base station to the operations and management entity.

17. The apparatus of claim 1, wherein the at least one memory including the computer program code is configured with the at least one processor to cause the apparatus to determine whether the identified random value is above a threshold; and based on the identified random value being above the threshold, reporting the detected event to the operations and management entity.

* * * * *